United States Patent [19]

Lange

[11] Patent Number: 5,242,035
[45] Date of Patent: Sep. 7, 1993

[54] CASTER WITH PIVOTABLE TWO-ARMED WHEEL BRAKE

[75] Inventor: Hans-Willi Lange, Wermelskirchen, Fed. Rep. of Germany

[73] Assignee: Albert Schulte Söhne GmbH. & Co., Wermelskirchen, Fed. Rep. of Germany

[21] Appl. No.: 768,059

[22] Filed: Sep. 27, 1991

[30] Foreign Application Priority Data

Nov. 6, 1990 [DE] Fed. Rep. of Germany ....... 4035195

[51] Int. Cl.$^5$ ............................................. B60B 33/02
[52] U.S. Cl. ................................... 188/1.12; 16/35 R
[58] Field of Search .................. 188/1.12, 2 R, 29, 31, 188/68, 69, 83, 84; 16/35 R

[56] References Cited

U.S. PATENT DOCUMENTS

| | | | |
|---|---|---|---|
| 3,911,525 | 10/1975 | Haussels | 16/35 R |
| 4,035,864 | 7/1977 | Schroder | 188/1.12 |
| 4,248,445 | 2/1981 | Vassar | 188/1.12 |
| 4,559,668 | 12/1985 | Black | 188/1.12 |
| 4,677,706 | 7/1987 | Screen | 16/35 R |
| 4,985,960 | 1/1991 | Zun | 188/1.12 |

FOREIGN PATENT DOCUMENTS 0259131  3/1988  European Pat. Off. ............ 16/35 R
3837307  9/1989  Fed. Rep. of Germany .

Primary Examiner—Robert J. Oberleitner
Assistant Examiner—Chris Schwartz
Attorney, Agent, or Firm—Peter K. Kontler

[57] ABSTRACT

A caster wherein the underside of the web of the wheel frame is formed with a socket for a fulcrum which is integral with and is located between two arms of a wheel brake. One arm of the brake carries a shoe which can be moved into frictional engagement with the wheel in response to downward movement of a post forming part of an actuator which is concealable in the leg of a piece of furniture or the like. The other arm of the brake is biased in a direction to move the shoe away from the wheel by a tongue of a springy plate-like member which is affixed to the underside of the web and further comprises two prongs which retain the fulcrum in the socket. The hub of the wheel is concealed behind caps which are carried by the frame, and the fulcrum as well as the plate-like member and the brake are also concealed from view.

12 Claims, 2 Drawing Sheets

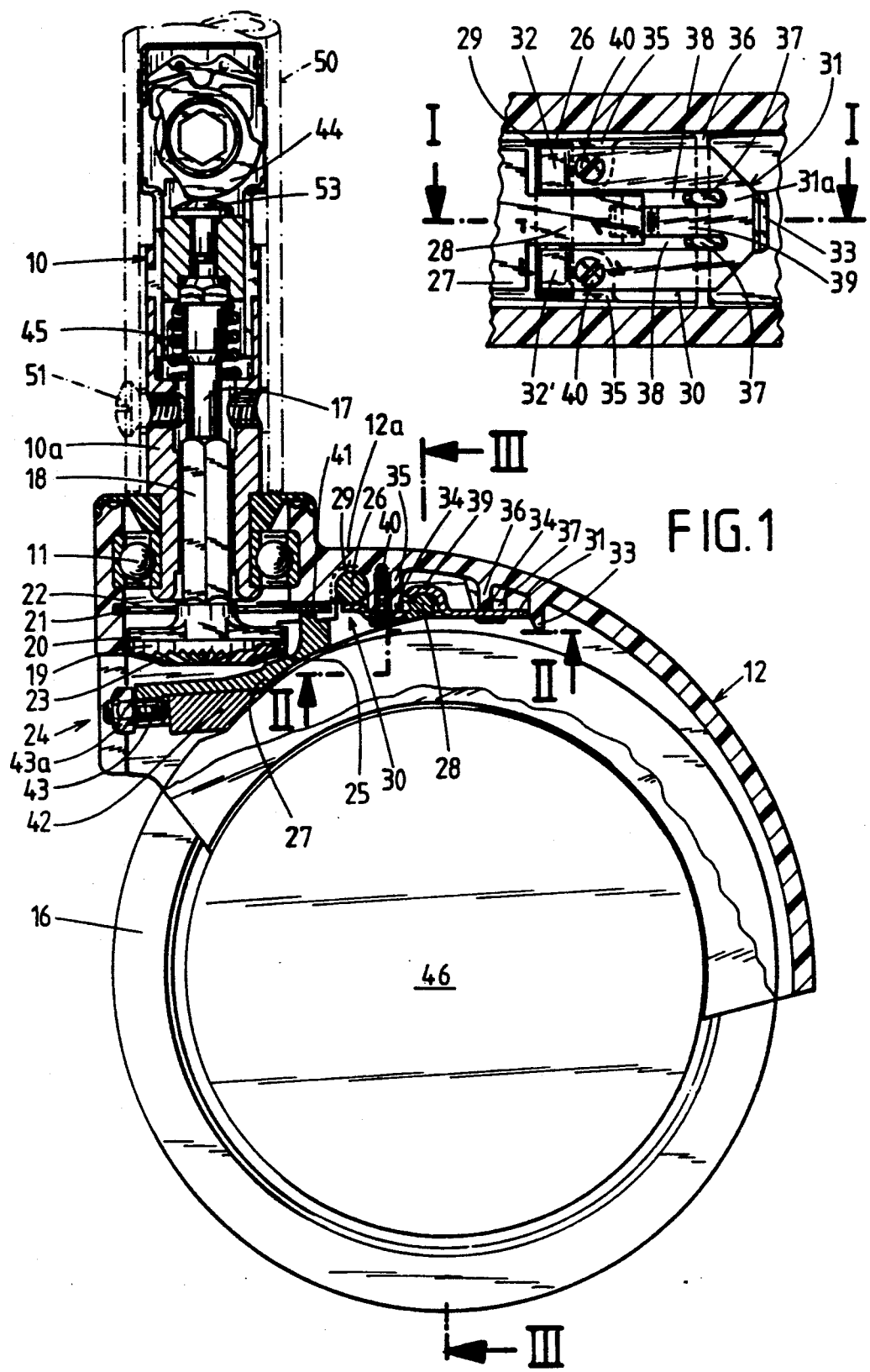

CASTER WITH PIVOTABLE TWO-ARMED WHEEL BRAKE

BACKGROUND OF THE INVENTION

The invention relates to casters in general, more particularly to improvements in casters which are provided with brakes for controlled frictional engagement with their wheels.

Commonly owned German Pat. No. 27 21 375 granted Oct. 10, 1985 to Albert Schulte Söhne GmbH & Co. discloses a caster wherein a rockable wheel brake is mounted on a pivot member which is rotatably anchored in the upper portion of the wheel frame. As a rule, the pivot member includes a head at one side of the frame, a shank or shaft which extends through the frame, and a retainer (e.g., a nut) engaging the shank or shaft at the other side of the frame. The outwardly extending head and nut detract from the appearance of the assembled caster. The pivotable brake assumes an angular position which is determined exclusively by gravity as soon as the brake is permitted to become disengaged from the peripheral surface of the wheel; this can result in the establishment of rubbing contact between the brake and the wheel, especially if the wheel of the patented caster is caused to roll along an uneven surface. Such rubbing contact can result in the generation of noise and offers at least some resistance to rotation of the wheel at a time when such resistance to rotation is neither desirable nor necessary.

Commonly owned German Pat. No. 38 37 307 granted Nov. 9, 1989 to Albert Schulte Söhne GmbH & Co. discloses a caster wherein the brake is constituted by a pivotably mounted leaf spring which is directly secured to the underside of the upper portion of the wheel frame by a set of screws. The leaf spring is installed in prestressed condition so that it tends to move away from the peripheral surface of the wheel. A drawback of the patented caster is that, as a rule, a leaf spring cannot carry an adjustable brake shoe which would permit compensation for wear upon the brake shoe and/or upon the wheel. In addition, the connection between the leaf spring and the wheel frame (by means of screws) is unreliable if the frame is made of a plastic material. Thus, the screws are likely to become loose in response to repeated flexing of the leaf spring, or the internal threads of the frame are simply destroyed so that the leaf spring becomes completely separated from the frame.

OBJECTS OF THE INVENTION

An object of the invention is to provide a caster wherein all such parts which could detract from the appearance of the caster are concealed from view.

Another object of the invention is to provide a caster wherein the brake is mounted in a novel and improved way.

A further object of the invention is to provide a novel and improved brake for use in the above outlined caster.

An additional object of the invention is to provide novel and improved means for mounting the brake in the wheel frame of the caster.

Still another object of the invention is to provide the caster with novel and improved means for preventing accidental blocking of rotation of the wheel frame relative to the commodity (e.g., a piece of furniture) which carries the caster.

A further object of the invention is to provide a caster wherein the brake is less likely to become disengaged from the wheel frame than in heretofore known casters, even if the wheel frame and/or the brake is made of a relatively inexpensive material, such as a plastic substance.

An additional object of the invention is to provide a novel and improved method of mounting the brake in the wheel frame of a caster.

SUMMARY OF THE INVENTION

The invention is embodied in a caster which comprises a wheel frame, a wheel which is rotatably supported by the frame, a brake having at least one arm movable into and from engagement with the wheel, means for pivotably connecting the brake to the frame including a fulcrum adjacent the at least one arm and extending into a socket which is provided in and is at least partly concealed by the frame and means for retaining the fulcrum in the socket, and means for pivoting the brake about the axis which is defined by the fulcrum in the socket to thereby move the at least one arm into engagement with or to permit disengagement of the at least one arm from the wheel.

The frame preferably includes at least one wheel supporting leg and a web which is rigid with the at least one leg and has an underside facing the wheel. The socket is preferably provided in the underside of the web, and the retaining means preferably comprises a springy plate-like member which overlaps an open side of the socket in the underside of the web (i.e., which overlaps the fulcrum in the socket). The frame has at least one surface which is adjacent the socket and abuts the springy plate-like member.

The fulcrum can form an integral part of the brake, and the brake preferably further comprises a second arm with the fulcrum disposed between the two arms of the brake. The pivoting means can comprise a reciprocable actuator and means for moving the actuator against the at least one arm of the brake.

The springy plate-like member can be provided with an elastic tongue which biases the second arm in a direction to move the at least one arm away from the wheel. Such member can further comprise two prongs which flank the tongue and the second arm and serve to bias the fulcrum into the socket. Still further, the plate-like member can comprise a crosshead which connects the prongs to each other and to the tongue and abuts a stop at the underside of the web of the wheel frame.

The caster preferably further comprises means for limiting the extent of movability of the at least one arm of the brake away from the wheel. Such limiting means can comprise a projection which is provided on and is movable with the at least one arm of the brake, and a stop which is provided on the frame (e.g., at the underside of the web) in the path of movement of the projection.

The aforementioned stop for the crosshead of the springy plate-like member is adjacent the socket in the web, and the retaining means preferably comprises at least one screw, bolt or another suitable threaded fastener which secures the plate-like member to the web. The web can be formed with protuberances each defining a surface which abuts the plate-like member; the at least one threaded fastener extends through the plate-like member and into the surface of one of the protuberances. Furthermore, the plate-like member can be provided with at least one slot and the web can be provided with at least one projection serving as a guide and extending from its underside into the at least one slot of the plate-like member.

The hub of the wheel can be overlapped by caps which are provided on the wheel frame.

The means for pivoting the at least one arm of the brake preferably defines a substantially vertical axis for rotation of the frame and wheel relative to the pivoting means, and the caster preferably further comprises at least one thrust bearing between the pivoting means and the wheel frame.

The novel features which are considered as characteristic of the invention are set forth in particular in the appended claims. The improved caster itself, however, both as to its construction and the mode of assembling and operating the same, together with additional features and advantages thereof, will be best understood upon perusal of the following detailed description of certain presently preferred specific embodiments with reference to the accompanying drawing.

BRIEF DESCRIPTION OF THE DRAWING

FIG. 1 is a partly elevational and partly vertical sectional view of a caster which embodies one form of the invention, the section being taken in the direction of arrows substantially as seen from the line I—I in FIG. 2;

FIG. 2 is a fragmentary horizontal sectional view substantially as seen in the direction of arrows from the line II—II in FIG. 1.

DESCRIPTION OF PREFERRED EMBODIMENTS

Figure 3:
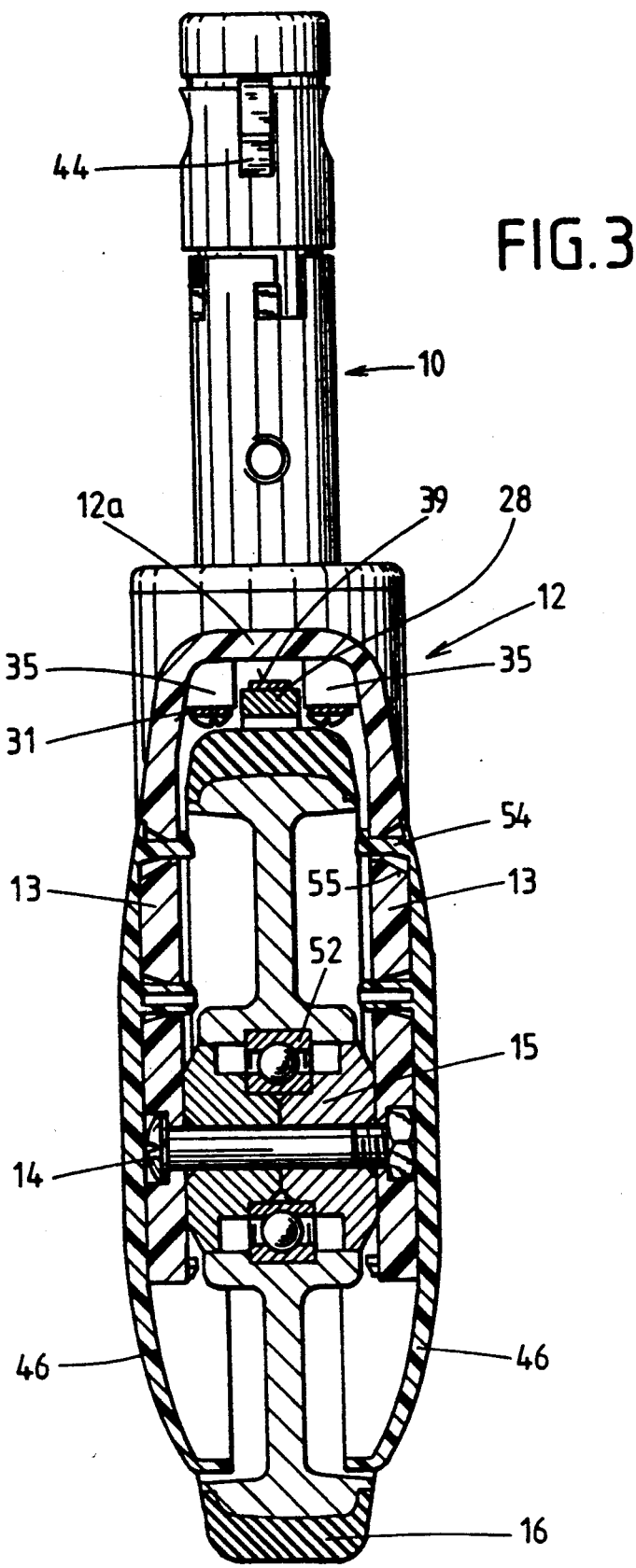
FIG. 3 is a sectional view substantially as seen in the direction of arrows from the line III—III of FIG. 1.

The caster which is shown in the drawing comprises an elongated actuator or pivoting means 10 which can be installed in a leg 50 or another part of a piece of furniture or at the underside of a conveyance or another object and can be secured to the leg by one or more screws 51 or other suitable fasteners. The lower end portion of the actuator 10 is surrounded by the rolling elements of a thrust bearing 11 which serves to rotatably connect the actuator with a wheel frame 12 in such a way that the frame and a wheel 16 which is carried by the frame can turn about a substantially vertical axis which is normal to the axis of rotation of the wheel 16 in the frame 12. The frame 12 has two legs 13 supporting the ends of a horizontal shaft 14 which extends through a hub 15 of the wheel 16 and defines a horizontal axis. The hub 15 can be rigid with the legs 13 of the frame 12; the caster then preferably comprises an antifriction roller bearing 52 or another suitable bearing which is interposed between the hub 15 and the remaining portion of the wheel 16.

The actuator 10 comprises a vertically reciprocable post or stud 17 which includes a portion 18 having a non-circular (e.g., polygonal) cross-sectional outline and being vertically movably but non-rotatably mounted in a casing or housing 10a of the actuator. The lower end portion of the post 17 is rigid or made of one piece with a disc-shaped member 19 having an upper side provided with two projections in the form of ribs 20 which are located diametrically opposite each other and can enter complementary openings or recesses 22 of a washer-like member 21 which is installed in a web 12a of the wheel frame 12. When the post 17 is free to rise under the bias of a coil spring 45 in the casing 10a, the ribs 20 are caused to enter the openings 22 and thus ensure that the frame 12 and the wheel 16 cannot rotate relative to the actuator 10, i.e., the wheel 16 is confined to rolling movement in a selected direction by rotating about the axis of the shaft 14 and hub 15.

The underside of the disc-shaped member 19 is provided with an annulus of radially extending teeth 23 which can be lowered to mate with complementary teeth of a gear segment 25 provided on the left-hand arm 27 of a pivotable two-armed brake 24 for the wheel 16. The arm 27 is provided with a brake shoe 42 which is moved against the periphery of the wheel 16 in response to downward movement of the post 17; at such time, the teeth 23 mate with the teeth of the gear segment 25 to completely immobilize the wheel 16, i.e., the wheel cannot rotate about the common axis of the shaft 14 and hub 15 because its peripheral surface is engaged by the brake shoe 42 and the wheel and the frame 12 cannot turn about the axis of the thrust bearing 11 because the teeth 23 of the non-rotatable disc-shaped member 19 mesh with the teeth of the gear segment 25.

The illustrated brake 24 is a shaped article having the aforementioned arm 27 with separately produced brake shoe 42, a second arm 28 and a fulcrum 26 between the arms 26, 28. The fulcrum 26 is or can be of one piece with the arms 27, 28 and extends from below into a socket 29 which is provided therefor in the underside of the web 12a so that the socket 29, the fulcrum 26, the arms 27, 28 and the brake shoe 42 are at least nearly but preferably fully concealed in the frame 12 beneath the web 12a. The socket 29 is open from below, and a means 30 for retaining the fulcrum 26 in the socket comprises a springy plate-like member 31 (e.g., a plate made of spring steel) which abuts a stop 33 at the underside of the web 12a and includes a centrally located tongue 39 (note particularly FIG. 2) which overlies the arm 28 and tends to pivot the brake 24 in a direction to move the arm 27 and the brake shoe 42 upwardly and away from the peripheral surface of the wheel 16. The tongue 39 is flanked by two prongs 32, 32' which overlie the end portions of the fulcrum 26 in the socket 29. The prongs 32, 32' are located at opposite sides of the arm 28. A crosshead 31a of the member 31 connects the prongs 32, 32' to each other and to the tongue 39 and abuts the stop 33.

The retaining means 30 further comprises two threaded fasteners 40 which extend through the prongs 32, 32' of the member 31 and into supporting surfaces 34 of protuberances 35 provided at the underside of the web 12a and abutting the upper sides of the respective prongs. In addition, the underside of the web 12a is provided with two projections 37 which serve as guides for and extend into the slots 38 of the member 31; these slots separate the tongue 39 from the prongs 32 and 32'. The guides 37 are integral with a rib 36 which extends from the underside of the web 12a across the full width of the member 31 adjacent the crosshead 31a.

The resilient brake 24 stores energy when the arm 27 is caused to maintain the shoe 42 in braking engagement with the wheel 16 because the arm 28 then bears against the underside of the elastic tongue 39 of the springy plate-like member 31.

The means for limiting the extent of movement of the arm 27 and brake shoe 42 away from the wheel 16 comprises a projection 41 which is provided at the upper side of the arm 27 and can engage a stop (e.g., a portion of the member 22) on the frame 12 when the brake 24 is free to pivot in a clockwise direction (as viewed in FIG.

1) because the tongue 39 is free to dissipate some energy.

The brake shoe 42 is adjustable relative to the arm 27 in order to regulate the braking action and/or to compensate for wear upon the shoe 42 and/or wheel 16. To this end, the underside of the arm 27 is formed with one or more grooves for complementary portions of the shoe 42, and the latter can be moved to the right or to the left (as seen in FIG. 1) in response to rotation of a threaded adjusting member 43 on the arm 27. A lock nut 43a is provided to fix the adjusting member 43 in a selected axial position relative to the arm 27.

The illustrated caster is provided with mechanical means for moving the post 17 of the actuator 10 for the purpose of pivoting the brake shoe 42 on the arm 27 into frictional engagement with the wheel 16 and for simultaneous blocking rotation of the frame 12 about the axis of the thrust bearing 11, as well as for lifting the post 17 so that the ribs 20 can enter the recesses 22 in order to confine the wheel 16 to movement in a single direction. However, it is equally within the purview of the invention to provide hydraulic, pneumatic or electromechanical means for moving the post 17 relative to the casing 10a.

The mechanical moving means for the post 17 includes the aforementioned spring 45 which urges the post upwardly (so as to enter the ribs 20 into the recesses 22), a follower 53 at the upper end of the post 17 and a cam 44 which is rotatable in the upper portion of the casing 10a and is tracked by the follower 53. The illustrated cam 44 can be turned by hand or in any other suitable way between three different positions in each of which a different cam lobe abuts the follower 53. FIG. 1 shows the follower 53 in engagement with a first lobe which is remotest from the axis of rotation of the cam 44 and maintains the post 17 in a lower end position in which the teeth 23 mate with the teeth of the gear segment 25, the brake shoe 42 is biased against the wheel 16 and the ribs 20 are located at a level well below the recesses 22. Thus, the frame 12 is held against rotation about the axis of the thrust bearing 11 and the wheel 16 is held against rotation about the common axis of the shaft 14 and hub 15.

The follower 53 abuts a second lobe of the cam 44 when the teeth 23 are disengaged from the teeth of the gear segment 25 so that the tongue 39 maintains the brake shoe 42 away from the wheel 16 but the ribs 20 are still located at a level below the recesses 22. Therefore, the wheel 16 is free to rotate relative to the frame 12 and the frame is free to rotate relative to the actuator 10.

When the follower 53 engages the third lobe of the cam 44, the spring 45 is free to lift the ribs 20 into the recesses 22 so that the wheel 16 is free to rotate relative to the frame 12 but the frame is maintained in a predetermined angular position relative to the casing 10a of the actuator 10.

As can be seen in FIG. 3, the legs 13 of the frame 12 carry caps 46 which overlie and conceal the hub 15 as well as the major portion of the remainder of the wheel 16. In fact, only the rim of the wheel 16 extends from the frame 12 and is free to contact the floor. FIG. 3 further shows that the caps 46 are provided with male detent elements 54 which extend into and are releasably held in complementary female detent elements 55 of the respective legs 13. An advantage of the caps 46 is that they enhance the appearance of the caster and reduce the likelihood of penetration of dust and/or other contaminants into contact with the bearing 52 and/or with sensitive parts at the underside of the web 12a.

The frame 12 can be made of a metallic or plastic material, the same as the brake 24. It has been found that the mounting means including the fulcrum 26 and the socket 29 ensures the establishment of a reliable connection between the frame and the brake even if these parts are made of a relatively inexpensive plastic material.

An important advantage of the improved caster is that the sensitive parts including the socket 29, the fulcrum 26, the springy member 31, the shoe 42, the thrust bearing 11 and the bearing 52 are at least substantially concealed and adequately shielded against contamination.

Another important advantage of the caster is that the frame 12 cooperates with the caps 46 to enhance the appearance of the caster which is of importance in many instances, e.g., when the caster is mounted on an expensive piece of furniture.

The springy plate-like member 31 performs a number of important functions in spite of its compactness and simplicity. Thus, the member 31 can directly or indirectly retain the fulcrum 26 in the socket 29, it can shield the parts 26, 28 and 29 from contamination, and it can maintain the brake shoe 42 out of contact with the wheel 16 when the cam 44 is caused to assume an angular position other than that which is shown in FIG. 1.

The fulcrum 26 need not form an integral part of the brake 24. However, the utilization of a fulcrum which is of one piece with or which is otherwise permanently affixed to the brake 24 is preferred at this time because it is not necessary to maintain a supply of fulcra independently of a supply of brakes.

The tongue 39 of the plate-like member 31 ensures that the brake shoe 42 cannot rub against the wheel 16 due to oscillation of the brake 24 about the axis of the fulcrum 26 when the wheel 16 is caused to roll along an uneven surface. Thus, the tongue 39 is stressed so that it invariably tends to maintain the shoe 42 out of contact with the wheel 16 as soon as the cam 44 is moved from the angular position which is shown in FIG. 1. The tongue 39 is bent out of the common plane of the prongs 32, 32' or vice versa because the tongue overlies and bears against the upper side of the second arm 28 of the brake 24 whereas the prongs 32, 32' abut the surfaces 34 at the undersides of the protuberances 35. This can be readily seen in FIG. 1.

The purpose of the projection 41 is to prevent the tongue 39 of the springy plate-like member 31 from accidentally lifting the arm 27 and the member 19 against the opposition of the coil spring 45 so that the ribs 20 would enter the recesses 22 and would prevent rotation of the frame 12 about the axis of the thrust bearing 11 at a time when such rotation of the frame is desirable or necessary.

The illustrated threaded fasteners 40 can be replaced with other means for preferably releasably affixing the member 31 to the web 12a of the wheel frame 12.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A caster comprising a wheel frame having at least one wheel supporting leg and a web rigid with said at least one leg and having an underside; a wheel rotatably supported by said at least one leg and facing the underside of said web; a brake for said wheel, said brake having a first arm movable into and from engagement with the wheel and a second arm; means for pivotably connecting said brake to said frame, including a fulcrum disposed between said arms and extending into a socket which is provided in the underside of said web and is open from below and is at least partly concealed by said frame, and means for retaining said fulcrum in said socket; and means for pivoting said brake.

2. A caster comprising a wheel frame; a wheel rotatably supported by said frame; a brake for said wheel, said brake having a first arm movable into and from engagement with the wheel and a second arm; means for pivotably connecting said brake to said frame, including a fulcrum disposed between said arms and extending into a socket which is provided in and is at least partly concealed by said frame, and means for retaining said fulcrum in said socket including a resilient plate member carried by said frame and having a tongue biasing said second arm in a direction to move said first arm away from said wheel; and means for pivoting said brake.

3. The caster of claim 2, wherein said member further comprises two prongs flanking said tongue and said second arm and biasing said fulcrum into said socket.

4. The caster of claim 3, wherein said member further comprises a crosshead which connects said prongs to each other and to said tongue and abuts a stop of said frame.

5. A caster comprising a wheel frame having at least one wheel supporting leg and a web rigid with said at least one leg and having an underside; a wheel rotatably supported by said at least one leg and facing the underside of said web; a brake for said wheel, said brake having at least one arm movable into and from engagement with the wheel; means for pivotably connecting said brake to said frame, including a fulcrum adjacent said at least one arm and extending into a socket which is provided in the underside of said web and is open from below and is at least partly concealed by said frame, and mean for retaining said fulcrum in said socker including a resilient plate member overlapping said socket; and means for pivoting said brake.

6. The caster of claim 5, wherein said frame has at least one surface adjacent said socket and abutting said member.

7. The caster of claim 5, further comprising means for limiting the extent of movability of said at least one arm away from said wheel, including a projection provided on and movable with said at least one arm and a stop provided on said frame in the path of movement of said projection.

8. The caster of claim 5, wherein said wheel has a hub and said frame is provided with caps overlapping said hub.

9. The caster of claim 5, wherein said pivoting means defines a substantially vertical axis for rotation of said frame and said wheel relative to said pivoting means, and further comprising at least one thrust bearing between said frame and said pivoting means.

10. A caster comprising a wheel frame including at least one wheel supporting leg and a web rigid with said at least one leg and having an underside; a wheel rotatably supported by said one leg and facing said underside; a brake for said wheel, said brake having a first arm movable into and from engagement with the wheel and a second arm; means for pivotably connecting said brake to said frame, including a fulcrum disposed between said arms and extending into a socket which is provided in said underside and is at least partly concealed by said frame, and means for retaining said fulcrum in said socket including a resilient plate member which abuts a stop provided on said web adjacent said socket, said plate-like member overlying the fulcrum in said socket and said retaining means further including at least one threaded fastener securing said member to said web; and means for pivoting said brake.

11. The caster of claim 10, wherein said web includes protuberances extending from said underside and having surfaces abutting said member, said at least one fastener extending through said member and into one of said protuberances.

12. The caster of claim 10, wherein said member has at least one slot and said web has at least one guide extending from said underside and into said at least one slot.

* * * * *